(12) United States Patent
Vignocchi et al.

(10) Patent No.: US 6,318,525 B1
(45) Date of Patent: Nov. 20, 2001

(54) SHOCK ABSORBER WITH IMPROVED DAMPING

(75) Inventors: Loris Vignocchi, Zola Predosa; Sandro Musiani, Marzabotto, both of (IT)

(73) Assignee: Marzocchi, S.p.A., Bologna (IT)

( * ) Notice: Subject to any disclaimer, the term of this patent is extended or adjusted under 35 U.S.C. 154(b) by 0 days.

(21) Appl. No.: 09/306,899

(22) Filed: May 7, 1999

(51) Int. Cl.⁷ ..................................................... F16F 9/34
(52) U.S. Cl. ................................... 188/319.2; 188/266.6; 188/322.2; 188/285
(58) Field of Search ............................ 188/266.1, 266.6, 188/322.2, 313, 314, 298, 318, 319.2; 267/64.15, 64.19, 64.27, 64.28

(56) References Cited

U.S. PATENT DOCUMENTS

| | | | | |
|---|---|---|---|---|
| 4,311,302 | * | 1/1982 | Heyer et al. | 188/314 |
| 4,515,253 | * | 5/1985 | Itoh | 188/314 |
| 4,546,959 | * | 10/1985 | Tanno | 267/64.15 |
| 4,732,244 | * | 3/1988 | Verkuylen | 188/318 |
| 4,732,408 | * | 3/1988 | Ohlin | 188/322.15 |
| 4,958,706 | * | 9/1990 | Richardson et al. | 188/319.1 |
| 5,454,452 | * | 10/1995 | Ohlin | 188/322.15 |
| 5,810,128 | * | 9/1998 | Eriksson et al. | 188/319.2 |

* cited by examiner

Primary Examiner—Robert J. Oberleitner
Assistant Examiner—Mariano Sy
(74) Attorney, Agent, or Firm—Ward & Olivo (57) ABSTRACT

The present invention provides a shock absorber having improved damping. On the base of the shock absorber there is fastened the bottom of a barrel on which rests the counter-acting spring which urges in expansion the piston of the shock absorber. The barrel contains damping fluid and has a piston which is axially movable with lateral seal. The shock absorber also has an external secondary flow dampening device which is connected to the base of the shock absorber via a tube. In the strut base, and the connecting appendage there is a plug adjustment which moves laterally and limits an alternative path of flow for the liquid through the base flow damper and the piston flow damper respectively. By acting on the plug adjustments it is possible to adjust the braking level in expansion of the strut. Each flow damper also is affixed with a shim. The shim on the piston flow damper will flex at an appropriate pressure in the expansion phase, thereby damping the reaction of the strut to expansion. Alternatively the shim at the base flow damper will flex at an appropriate pressure in the compression phase damping the reaction of the strut to compression.

31 Claims, 7 Drawing Sheets

FIG. 1

FIG. 1A
(EXPANSION)

FIG. 1B
(COMPRESSION)

SHOCK ABSORBER WITH IMPROVED DAMPING

TECHNICAL FIELD OF THE INVENTION

The present invention relates generally to motorcycles and mountain bikes, and more particularly to suspension fork assemblies for use with the same. Specifically, the present invention provides an apparatus and method for an improved shock absorber having increased damping, with this improved shock absorber providing a suspension with greatly improved stability and damping for a much more stable ride over rough terrain.

BACKGROUND OF THE INVENTION

The present invention has particular application to motorcycles commonly referred to as "dirt bikes" or mountain bike which are typically ridden over rough terrain and/or on steep uphill or downhill slopes.

Of particular concern to the "off-road" motorcycle rider is the jolting of the wheels as disturbances in the ground surface, such as rocks, holes, or vertical drops, are encountered. This jolting is transferred to the rider through the wheels, fork, frame, and ultimately the rider's body. In addition to the potential discomfort to the rider, there is the added concern for safety. That is, the motorcycle becomes difficult to control at the instant of a severe jolt being experienced by the rider through the handles, and frame.

To overcome this problem of severe jolting, designers of motorcycles have developed front and rear wheel, shock absorbing suspension systems. These shock absorbing systems include a rigid rod (or inner tube), which is slidable within a rigid sleeve (or outer tube) and a biasing member which can operate pneumatically, hydraulically, elastomerically or with metallic springs, positioned within the rigid sleeve to achieve the "shock-absorbing" action. The biasing member extends the fork rods relative to the sleeves, and as obstacles are encountered by the front or rear wheel, the biasing members of the fork's rigid sleeves collapse as the slidable rods are compressed in the sleeves, thereby absorbing the severe jolt. Additionally, the sliding rod may have a slight degree of rotatability within the sleeve.

Therefore, when an obstacle is encountered directly, the forces are substantially in the same axis as the suspension system, and the slidable rods are typically displaced uniformly. However, during cornering or other maneuvering, the forces are not in the same axis as the suspension such that torsional and lateral stresses are created, and typically one of the rods is compressed or displaced into the corresponding sleeve more so than the opposite rod. Because the slidable rod has a slight degree of rotatability within the sleeve, high stresses are created at the dropout-to-axle connection when lateral and torsional forces are applied to the wheel in contact with the ground, such as in cornering.

Also, when brakes are applied in stopping or cornering, the brakes push outward and a large amount of torsion acts on the lower two fork tubes. The resistance to this torsion is mainly provided by the wheel axle and the brake arch. Thus, increased rigidity and strength are highly desired throughout the front fork, especially at the wheel axle, brake arch and/or crown regions.

One new design to increase the strength and rigidity at the wheel axle comprises an enlarged wheel hub and axle (the axle being approximately 20 mm in diameter). While uniform compressions relieve stress on the wheel, fork, steering tube, and steering handle, unbalanced compressions, such as from cornering and maneuvering, the stresses on the wheel axle remain high. Therefore, increased rigidity and strength in the wheel axle is highly desirable for off-road motorcycles. Such a novel design in discussed in co-pending application Ser. No. 09/189,448, which is herein incorporated by reference. However, there remains a need to provide a suspension system which will reduce compression forces incurred during ordinary use of the motorcycle.

Furthermore, an additional concern for motorcycle riders is the weight of the bicycle or motorcycle. A lighter motorcycle is more desirable because it takes less force to power and maneuver. As such, manufacturers of high-end performance bikes and their components are continuously upgrading them to decrease the overall weight. This has typically been accomplished in at least three ways. One is to use lighter materials such as aluminum alloys and carbon-graphite components. Another is to decrease the overall number of components that comprise the bicycle or motorcycle. Yet another is to decrease the thickness of the components used without sacrificing their strength.

An example of such an improvement is described in co-pending application Ser. No. 09/236,998 (the "'998 application"), which is herein incorporated by reference. In this case, separate components are combined at the front fork suspension system of the bicycle. Typically, a front fork suspension system includes a crown which allows attachment of the central steering tube and a pair of parallel fork legs which each comprise an outer rigid sleeve and inner rigid rod which are slidably engaged with each other. Conventionally, the crown is connected to the fork legs via an adhesive or some form of mechanical connection (i.e., screws). In one conventional system, the crown is provided with three openings wherein the outer two openings has slits near each of the outer ends. The center opening receives the steerer tube, usually press fit into this opening. The outer two opening receive the upper ends of the parallel fork legs, usually the upper ends of the inner rigid rods. Then, screw(s) or some other threaded fastening device(s) is employed to close or clamp the crown openings onto the upper ends of the inner rigid rods to form a tightly secured attachment.

Although quite simple, this mechanical means for attaching the fork legs to the crown has several disadvantages, some of which include increased overall weight of the forks, increased number of stress points as well as increased stresses at these points, decreased overall strength and stability, etc. The invention of the '998 application has overcome these shortcomings through a novel method of manufacturing the crown and legs as a single component. This "monolithic" crown/fork design results in an overall lighter fork due to the elimination of extra components, increased strength and stability due to the elimination of high stress locations as well as a reduction in the stresses created at the interface of multiple components.

Also, in conventional suspension forks, a brake arch is typically mounted on the upper portion of the lower fork legs via screws or other threaded fastening devices, one on each rod, while the brake arch has receptacles for mounting brake calipers. In an alternative design, known as an upside down (or inverted) fork, the outer rigid sleeves and inner rigid rods are reversed. More specifically, the crown is connected to the outer rigid sleeves rather than to the inner rigid rods as previously described. This inverted design provides greater strength and stability at the crown/fork leg interface.

Additionally, recent trends show an increased use of disc brakes on motorcycles due to their increased performance and high durability. Typical disc brake systems are mounted on one of the dropouts at the wheel axle for maximum performance. Conventionally, the disc brakes comprise a separately mounted caliper containing the brake pads which, when in the closed position (i.e., pressed together), provide a high degree of frictional force to slow the wheel to a stop. It is therefore appreciated that the present invention can be used with motorcycles having either a conventional brake arch design or a conventional disc brake system.

SUMMARY OF THE INVENTION

The present invention relates generally to suspension systems for bicycles or motorcycles. In particular, the present invention provides an adjustable shock absorber comprising a second damping mechanism to receive fluid from the main strut(s) to provide an enhanced damping of the shock absorber system in the compression phase. It is therefore an object of this invention to provide an improved shock absorber comprising a secondary damping mechanism (hereafter "SDM",or fluid chamber) which thereby provides increased damping and stability, without significantly increasing the overall weight of the suspension system. These and other advantages of the present invention will become more thoroughly apparent through the following description of the preferred embodiments and the accompanying drawings.

It will be appreciated that those skilled in the art will recognize that variations and modifications may be made without departing from the true spirit and scope of the invention. The invention is therefore not to be limited to the illustrations and descriptions set forth below but is to be determined by the appended claims.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings is not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

The following presents a detailed description of a preferred embodiment of the present invention. As discussed above, the present invention relates generally to motorcycles, but may be applied wherever suspension systems are used. Specifically, the present invention provides an apparatus and method for improved damping in suspension systems. Reference is herein made to the figures, wherein the numerals representing particular parts are consistently used throughout the figures and accompanying discussion.

Figure 1:
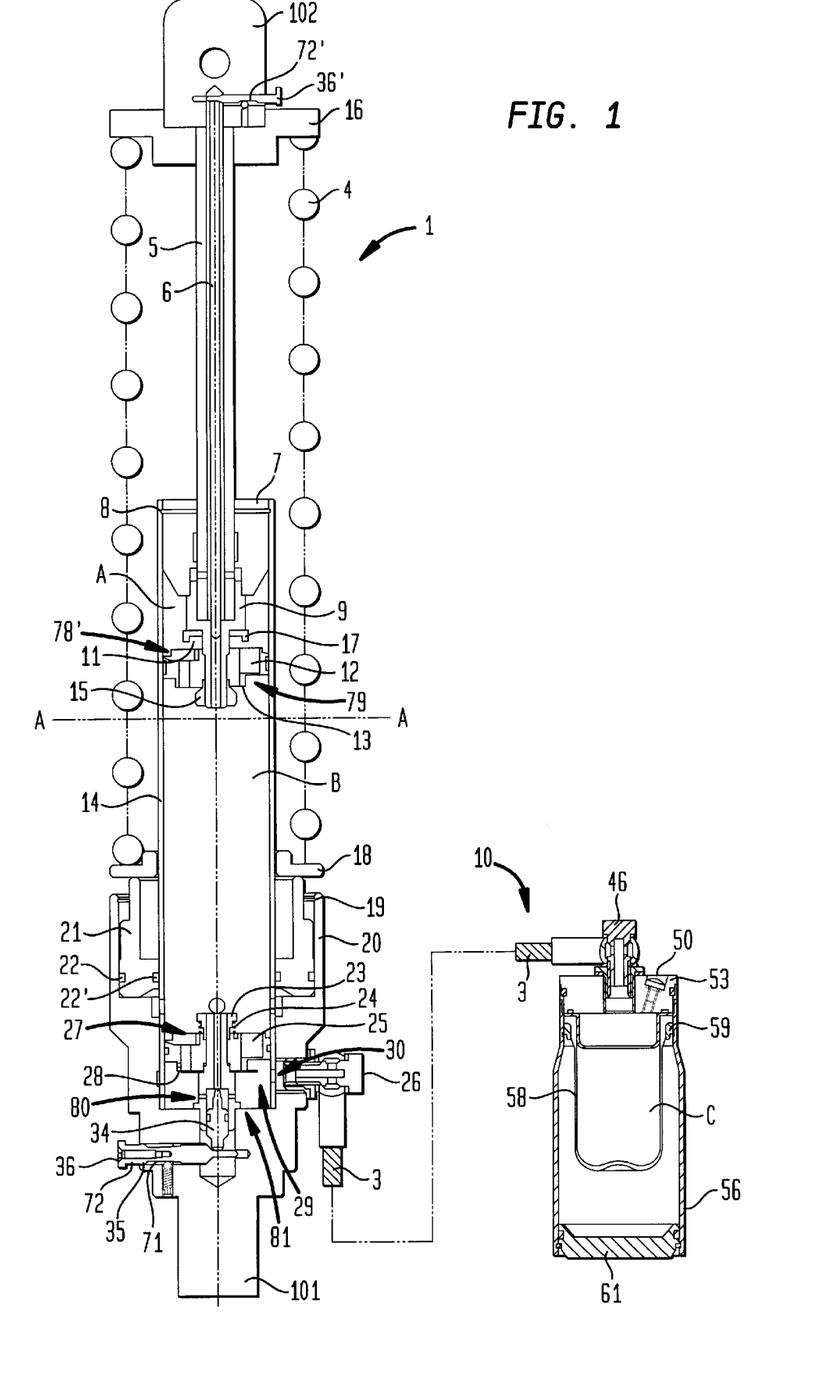
FIG. 1 shows an overall front plan view of a preferred embodiment of the apparatus for providing improved damping in a suspension system according to the present invention.
Figure 1A:
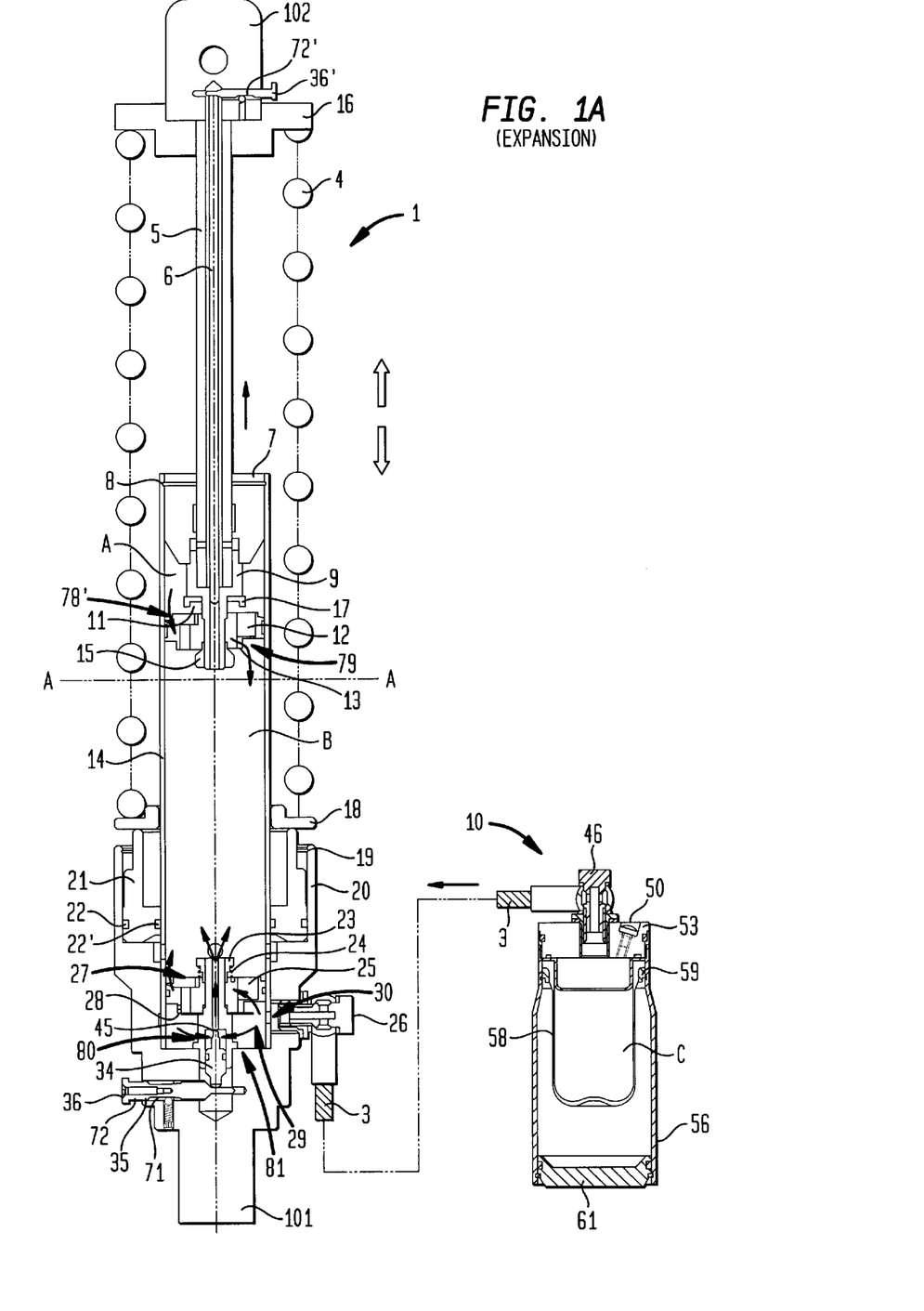
FIG. 1a shows an overall front plan view of a preferred embodiment of the apparatus for providing improved damping in a suspension system according to the present invention in the expansion phase.
Figure 1B:
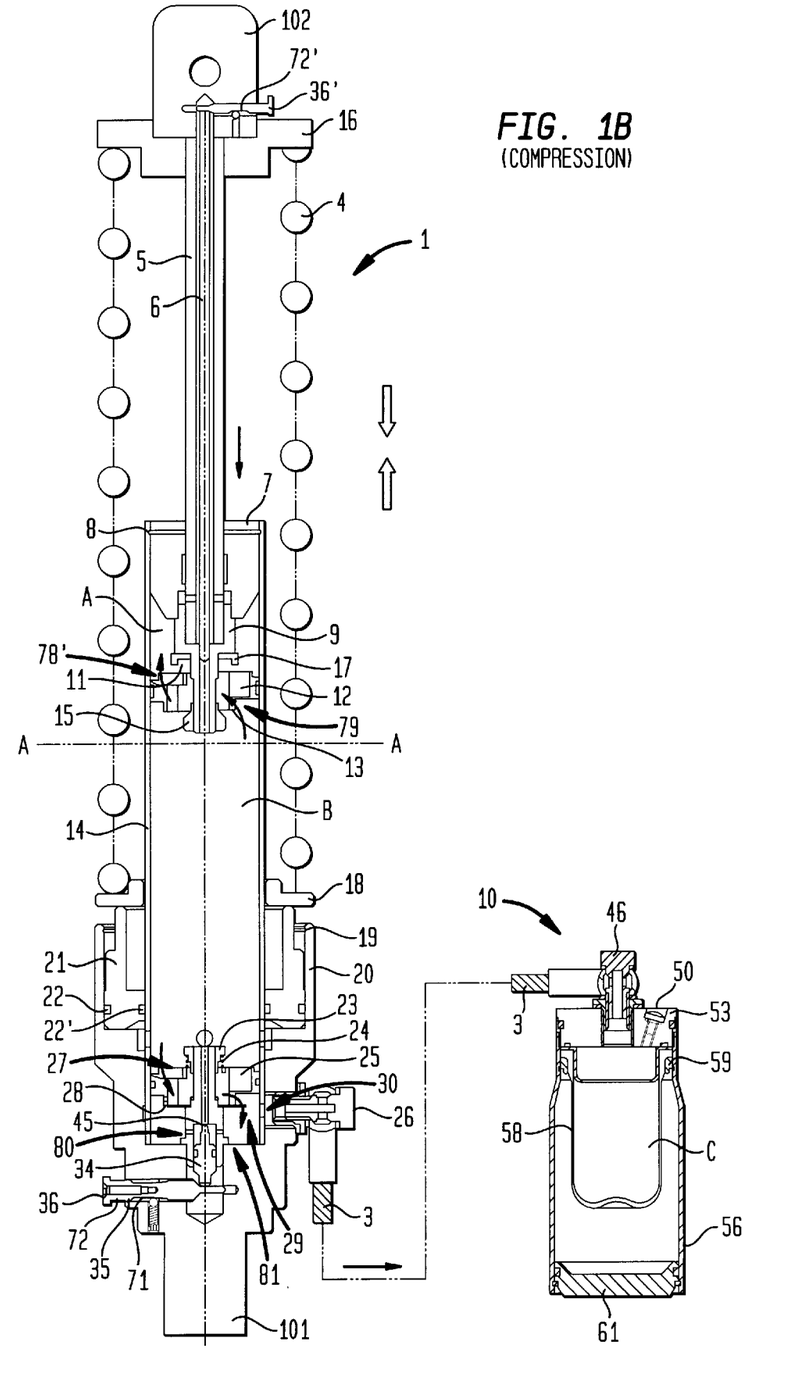
FIG. 1b shows an overall front plan view of a preferred embodiment of the apparatus for providing improved damping in a suspension system according to the present invention in the compression phase.

With reference first to FIGS. 1, 1a & 1b, shown is an overall front plan view of a preferred embodiment of the apparatus for providing improved damping in a suspension system according to the present invention, including strut 1 and secondary damping means 10. As depicted, FIGS. 1, 1a & 1b show secondary damping means 10 attached to strut 1 via tube 3. During the compression phase of strut 1, fluid from the internal cavities of strut 1 flows through tube 3 into secondary damping means 10. Conversely, during the expansion phase of strut 1, fluid from secondary damping means 10 flows through tube 3 into the internal cavities of strut 1. Accordingly, secondary damping means 10 provides added damping to existing damping mechanisms within strut 1, which are described in detail below.

The strut 1 of the shock absorber is equipped in the lower part with a connecting appendage 101 (i.e., for the formation of a stem of a fork for a motorcycle, for the fastening to the axis of the rear wheel of the motorbike, etc.). Optionally, strut 1 may be equipped with additional appendages (not shown) for the support of a disc brake caliper or other conventional bicycle or motorcycle component. Similarly, the upper part of strut 1 (See FIG. 2) comprises connecting appendage 102 for attaching strut 1 on its upper end to the motorcycle frame below the seat area. Directly below the connecting appendage 102 is attached a truing cap 16. The truing cap 16 supports the upper end of the helical coil spring 4 which provides the mechanical damping of the strut. In addition at the center of the connecting appendage 102 is attached the piston 5. At the center of the piston is a shaft 6 integral with barrel 14. Within the connecting appendage 102 at the location were the same meets the piston 5 there is a "silo" shaped free space 44'. Free space 44' is intersected by a hole 35' that extends from the wall of connecting appendage 102 to the lower edge of the free space 44'. Within the hole 35' is a manual shaft adjustment 36' which moves laterally. There is a counterbore 72' about the side of the shaft adjustment 36'. Perpendicular to the hole 35', from the bottom of connecting appendage 102 there is a channel 40' which is internally threaded at the base. A spring loaded pin 39', which is externally threaded, is screwed into channel 40'. With the shaft adjustment 36' in place, the spring loaded pin 39' limits the movement of the shaft adjustment 36' to the length of the counterbore 72'. The free space 44' is at the center of base 20, and has a silo shaped recess 71' opposite of the shaft adjustment 36', which is designed to accommodate the shaft adjustment 36' at full extension. The movement of the shaft 6 is limited by the shaft adjustment 36'. Due to the taper 73' in the shaft adjustment 36', when the shaft adjustment is moved inward the shaft 6 is forced downward. The shaft 6 then restricts flow through the center hole 105, of the piston flow damper 12 and may even stop flow entirely.

Figure 3:
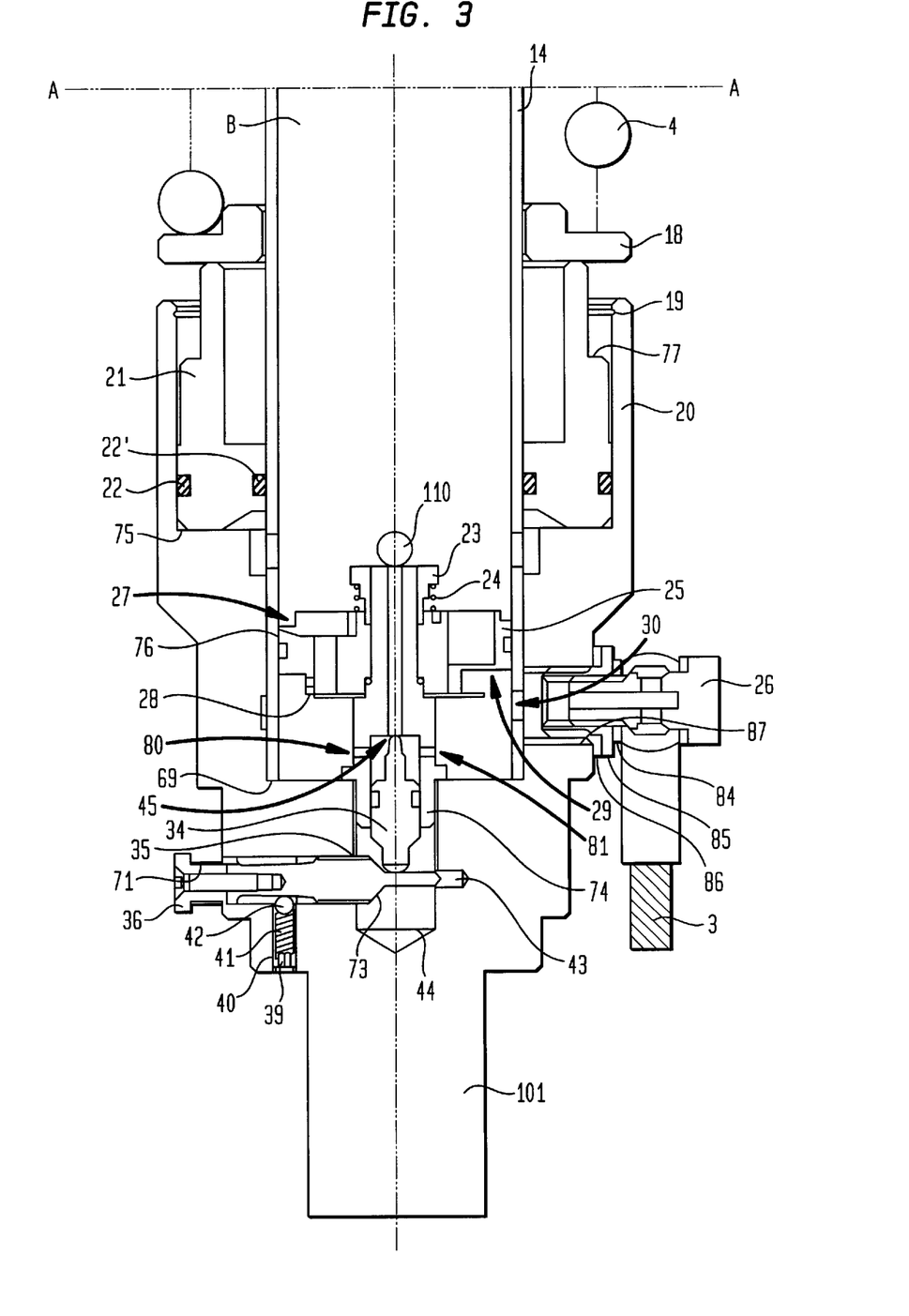
FIG. 3 shows an enlarged front plan view of the region of the apparatus for providing improved damping in a suspension system shown in FIG. 1 below line A—A.

As seen in FIG. 3 the strut base 20 is tapered in three levels being most narrow towards the bottom where the connecting appendage 101 is located and widest at the upper most portion where it accepts the strut barrel 14. Immediately above the connecting appendage 101 base 20 has a cylindrically shaped free space 44 at its center. Free space 44 is intersected by a hole 35 that extends form the wall of base 20 to the lower end of the free space 44. Within the hole 35 is a manual plug adjustment 36 which moves laterally. There is a counterbore 71 about the side of the plug adjustment 36. Perpendicular to the hole 35, from the bottom of base 20 there is a channel 40 which is internally threaded at the base. A spring loaded pin 39, which is externally threaded, is screwed into channel 40. With the plug adjustment 36 in place, the spring loaded pin 39 limits the movement of the plug adjustment 36 to the length of the counterbore 72. The free space 44 is at the center of base 20, and has a silo shaped recess 43 opposite of the plug adjustment 36, which is designed to accommodate the plug adjustment 36 at full extension. Resting upon the plug adjustment 36 is a plug 34. Due to the taper 73 in the plug adjustment 36, when the plug adjustment is moved inward the plug 34 is forced upward. When forced upward the plug 34 restricts flow through the center hole 45, of the flow damper base 25 and may even stop flow entirely.

At the upper edge of the free space 44 in base 20 is affixed a flow damper base 74. The flow damper base 74 supports a shim 28, and ultimately the lower flow damper 25. The flow damper 25 is held in place by a clip 23. A helical coil 24 in compression is located above the lower flow damper 25 and below the clip 23. The helical coil 24 creates a dampening of the initial compression which may be experienced by the strut. Base 20 has a seat 69 where there is fixed the barrel 14. At the lower end of the barrel 14 there is at least one hole 30 whereby fluid may pass in both the compression and expansion phases. The lower flow damper 25 forms a tight seal 76 with the inner wall of the barrel 14. There are also at least three holes 110 above the lower flow damper 25 which allow liquid to flow from the barrel 14 in area B, to the free space below support/rebound ring 21. At the upper most portion of base 20 where it increases in diameter, a seat 75 is formed between the barrel 14 and the wall of base 20. A support/rebound ring 21 is placed in the seat 75 and a seal is formed by cylindrical washer 22 at the inner wall of base 20, as well as washer 22' at the outer wall of the barrel 14. An annular recess 77 is located on the outer portion of the upper third of the support ring 21. The annular recess provides a movement area for both base 20 and the support/rebound ring 21 during the use of the strut. A cylindrical washer 19 forms a seal at the top of the annular recess 77 to maintain the strut free of foreign material. Resting on top of the support ring 21 is a truing cap 18. The truing cap 18 supports the lower end of helical coil 4 which provides mechanical dampening of the strut during compression and expansion.

Figure 4:
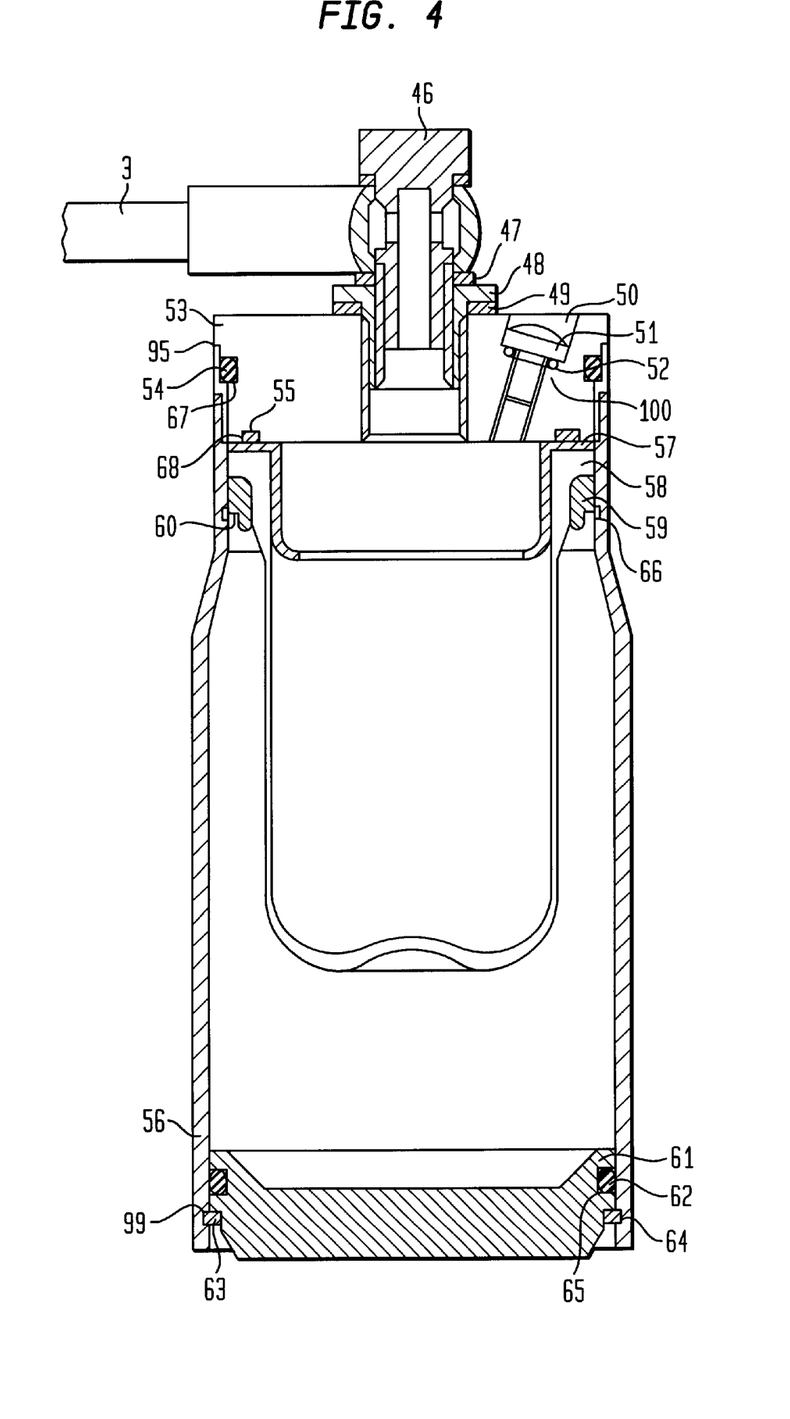
FIG. 4 shows an enlarged front plan view of the secondary damping means shown in FIG. 1.

Base 20 has an internally threaded recess 87 where hole 30 of the barrel 14 is aligned. The recess 87 is fitted with a screw 85 which is threaded both internally and externally, separated by a flat washer 86. A valve assembly 26 which is externally threaded is then attached to the screw 85, again with a flat washer 84 providing separation between the two parts. The tube 3 is attached to the open end of the valve assembly 26, and passes over to another valve assembly 46, at the SDM 10 shown in FIG. 4. The valve assembly 46 attaches to a screw 48, with a flat washer 47 between the valve assembly 46 and the screw 48. The screw 48 which is threaded on both sides is attached to a plug 53 at the top of the SDM 10. A flat washer 50 is located between the top of the plug 53 and the bottom of the screw 48. The plug 53 has a hole 50 which is tapered and creates a seat 100. The hole is used to provide a means for adding or removing fluid or possibly relieving pressure within the SDM 10. A plug 51 is recessed within the hole 50 forming a seal with cylindrical washer 52 at the seat 100. There is a seat 95 on the plug 53 where the top of the shell 56 of the SDM 10 attaches. The plug 53 has a vertical recess 67 where a cylindrical washer 54 is located, and forms a seal between the shell 56 and the plug 53. The SDM shell 56 has a recess 60 where a ring clip 66 is fixed. The ring clip 66 supports a bullnose shaped ring washer 59, which has an internal diameter slightly smaller than the outer shell 56. A flexible inner shell 58 with a rigid rim is located within the SDM 10. The rim of the flexible shell 58 is supported from below by the ring washer 59, and is held in place from above by a washer 57. The upper surface of the washer 57 forms a seal with the lower surface of the plug 53, which is supplemented by a cylindrical washer 55 located within a horizontal recess 68 of the plug 53. The shell 56 of the SDM 10 has an additional vertical recess 64 near the bottom of the SDM 10. The recess 64 is fixed with a snap ring 63 which supports the damper base 61 by way of the seat 99. Damper base 61 forms a seal with the shell 56 with a cylindrical washer 62 within a vertical recess 65.

Figure 2:
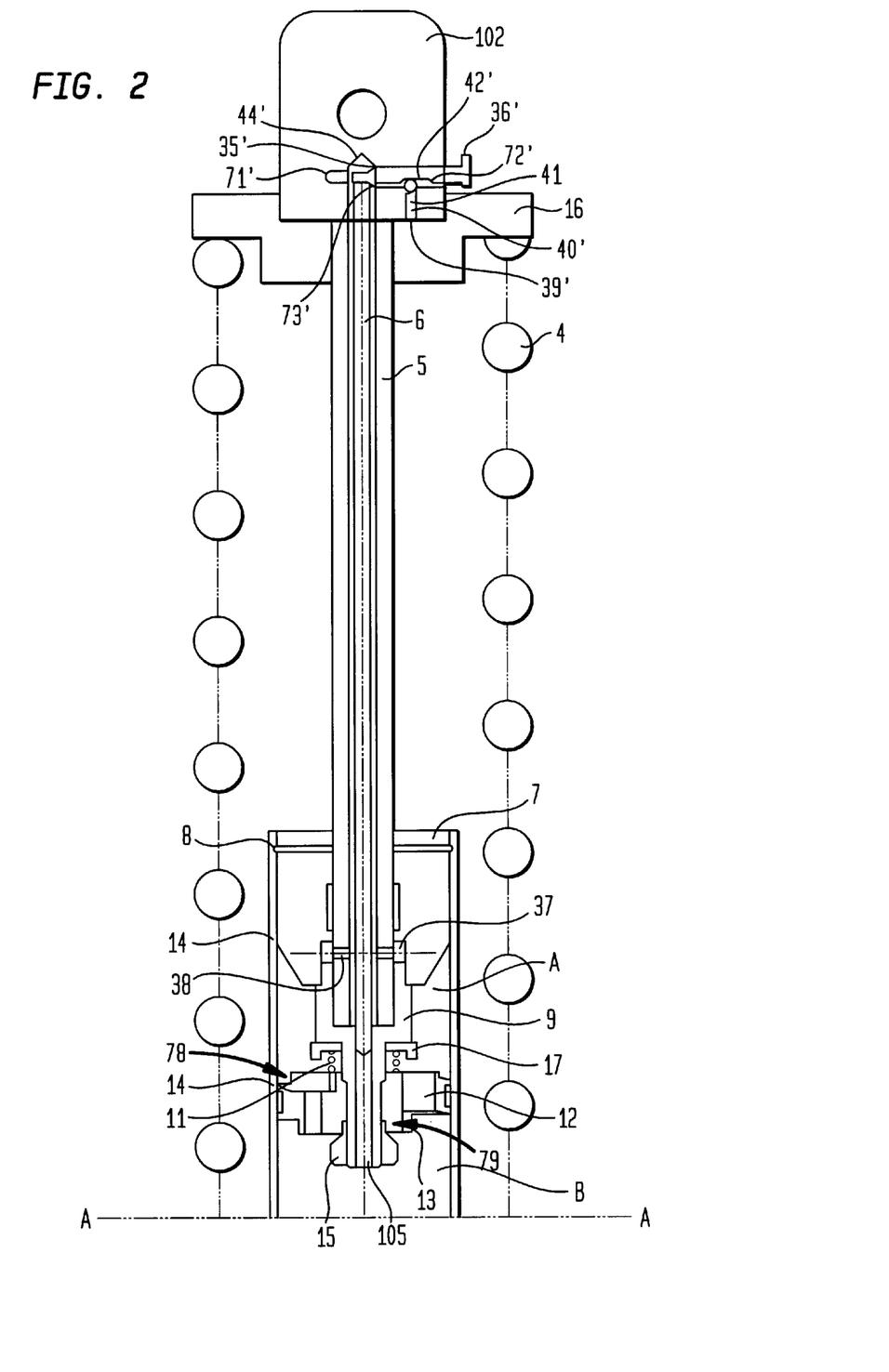
FIG. 2 shows an enlarged front plan view of the region of the apparatus for providing improved damping in a suspension system shown in FIG. 1 above line A—A.

At the top of the barrel 14, as shown in FIG. 2 a plug 7 forms a seal both with the outer wall of the piston 5, and the inner wall of the barrel 14. A cylindrical washer 8 reinforces the later. At the lower end of the piston 5 is affixed a flow damper base 9. The flow damper base 9 supports a truing cap 17, a shim 13 and ultimately the upper flow damper 12. The flow damper 12 is held in place by a clip 15. A helical coil 11 in compression is located between the lower flow damper 12 and the truing cap 17. The helical coil creates a dampening of the initial compression which may be experienced by the strut. The flow damper 12 forms a seal with the inner wall of the barrel 14. The seal forces fluids to flow past the flow damper 12 when the flow damper moves the length of the barrel 14 as a result of compression or expansion of the strut.

When the strut 1 is in the fully compressed position the Secondary Damping Means (Hereafter "SDM") 10 should be filled with a correct amount of suitable fluid. The piston 5 should then be retracted drawing the appropriate amount of fluid from the SDM through the tube 3, into the barrel 14. In the compression phase of the strut 1, as seen in FIG. 1b and 2, the cylindrical coil spring 4 is contracted and the piston 5 passes downward through the plug 7 of the barrel 14. Fluid in area B of the barrel 14 may take two alternative paths to reach the area above the flow damper 12. The liquid may pass into the upper flow damper 12 through opening 79.

Opening 79 is restricted in size by the shim 13. The flex of this shim 13 during the expansion of the strut, to allow an increased flow rate will be discussed later in this section. The fluid then passes out of the flow damper 12 through hole 78, into the area of the barrel 14 above the flow damper 12 labeled area A. Alternatively the liquid may pass into the center of the piston 5 through hole 105, up through piston 5 and out into area A through holes 37 and 38. As described above, the path through the center of the piston may be limited by the forcing of shaft 6 within piston 5 downward, thereby either restricting flow through hole 105, or blocking it entirely. The manual shaft adjustment 36' would thereby offer a means for a user to adjust the response of the strut to compression and expansion according to his or her specific needs or preferences.

Figure 5:
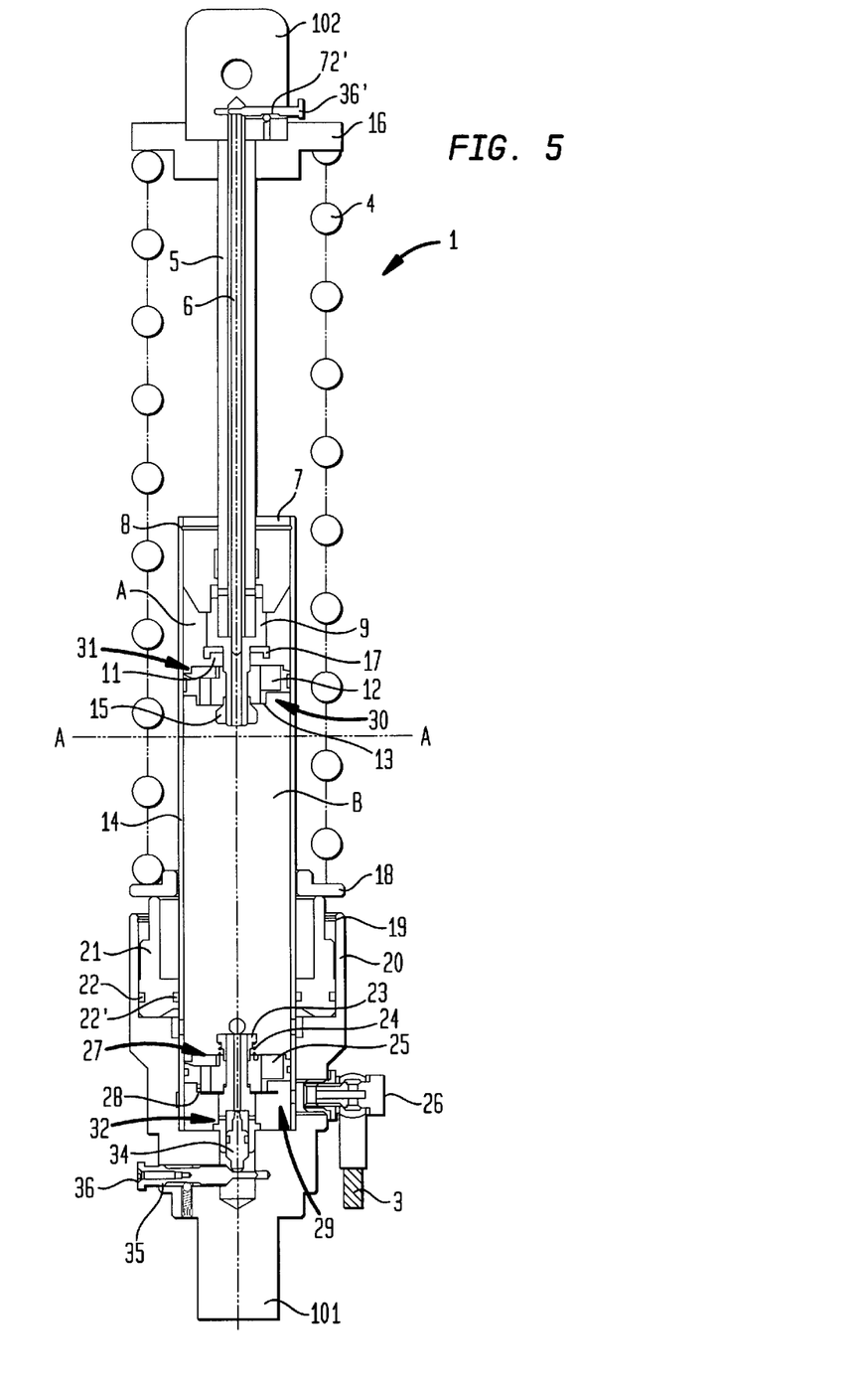
FIG. 5 shows a front plan view of an alternate embodiment of the apparatus for providing improved damping in a suspension system according to the invention without the use of the external damping means.

The volume above the upper flow damper 12 in area A at full compression is less than the volume of B at full expansion, therefore either the liquid within the strut must be limited to a volume less than or equivalent to the maximum capacity during full compression, or during compression the fluid which is associated with the difference in the respective volumes must pass to the SDM 10 via tube 3. An alternative embodiment of the strut which does not employ the SDM is shown in FIG. 5. The flow paths, and operation described in this embodiment would be identical to that available in the alternative embodiment shown in FIG. 5 except for the use of the SDM.

If the SDM is employed however in order for the liquid to pass from area A into the SDM 10 upon compression, the fluid may take two alternative paths. The liquid may enter the lower flow damper 25 through opening 27. The fluid then exits the flow damper 25 through opening 29 into the free space within the barrel 14 below the lower flow damper 25. The openings 27 and 29 of the flow damper 25 restricts the rate at which the fluid may flow and, and assuming a fluid of low compressibility is used the rate at which the piston 5 may compress is also decreased. The slower reaction of the strut to the changes in the ground surface which results, creates the improved ride quality which is desired. The size of hole 29 is also limited by the shim 28 attached to the base. The shim 28 is manufactured of an appropriate material such that at a certain force during the compression phase the shim will flex downward thereby increasing the area of hole 29. This increased area will allow greater flow rates of liquid to be achieved at the same pressures. The shim will not flex during the expansion phase however due to the physical limitations placed on it by the flow damper 25. Therefore at any fixed force and resultant pressure in expansion, and even flow rate of liquid, and therefore rate of compression of the strut should be expected. The second path which the liquid may take is through the center of the flow damper base 74. The fluid may enter the flow damper base 74 through hole 45. The fluid will then pass through openings 80 and 81 into area the free space below the flow damper 25. The amount of flow which may pass in this way may be limited however by movement of the plug adjustment 36 as noted earlier. When the plug adjustment 36 is moved inward the plug 34 is forced into the hole 45 restricting flow through this path. Alternatively when the plug adjustment 36 is moved outward the plug 34 is allowed to fall opening the hole 45, and restoring flow through this path.

The fluid within the free space which is now under pressure due to the compression of the strut flows to the SDM 10 through the hole 30 in the barrel 14. The fluid passes out of the free space through hole 30 into the valve assembly 26. While the valve assembly is in the open position fluid will flow through tube 3 into the valve assembly 46 at the other end of the tube 3. Again providing that the valve assembly 46 is in the open position, fluid will pass through the plug 53, and into area C of the flexible shell 58. As the volume of fluid passing through the tubing 3 increases, the pressure within the flexible shell will increase. The increased pressure will produce a Secondary Dampening Means on the strut. The more compressed the strut becomes the greater the pressure within the SDM 10 will become, and the more force that will be required on the strut to continue the compression.

As seen in FIG. 3, during the compression phase, liquid within area B is also forced through hole(s) 46 into the free space below the support/rebound ring 21. The resultant force associated with the increased pressure in this area forces the support/rebound ring upward increasing the compression of the helical coil 4. This increased compression creates a rebound affect in the strut. Alternatively in the expansion phase the pressure within area B will decrease. Liquid within the free space way below the support/rebound ring will flow to the lower pressure of area B, allowing the support/rebound ring to drop.

In the expansion phase of the strut, as shown in FIG. 1a, the piston 5 and the cylindrical coil 4 are expanded. The fluid follows the opposite path which it did in the compression phase. Fluid within the SDM 10 which would be under pressure following the compression phase will travel from the area of high pressure within the SDM 10 to the area of lower pressure which is created within the barrel 14 during the expansion phase. Specifically the fluid will flow from area C of the flexible shell 58, through the plug 53 into the valve assembly 46. Provided that the valve assembly 46 is in the open position the fluid will pass via tube 3 into the valve assembly 26 at base 20. The fluid will flow from the strut base 20 into the barrel 14 through hole 30 into the free space below the lower flow damper 25. The fluid may take two paths from the free space below the lower flow damper 25 to the area B above the lower flow damper 25. The fluid may enter the flow damper base 74 through openings 80 and 81. The fluid will then pass through hole 45 through the center of the flow damper base 74 to area B. The amount of flow which may pass in this way may be limited however by movement of the plug adjustment 36 as noted earlier. When the plug adjustment 36 is moved inward the plug 34 is forced into the hole 45 restricting flow through this path. Alternatively when the plug adjustment 36 is moved outward the plug 34 is allowed to fall opening the hole 45, and restoring flow through this path. The alternative path for the fluid from the free space below the lower flow damper 25 to area B is through the flow damper 25. The fluid enters through opening 29 and exits the flow damper 25 through opening 27. The shim 28 will not operate in the expansion phase as it might in the compression phase because it's movement is physically restricted by the flow damper 25. Therefore at any fixed force and resultant pressure in expansion, and even flow rate of liquid, and therefore rate of expansion of the strut should be expected.

While the strut 1 is in the expansion phase fluid is also flowing from area A above the upper flow damper 12, into area B, below the upper flow damper 12. When the piston 5 retracts the volume of area A becomes smaller increasing the pressure within area A and decreasing the pressure within area B. This pressure gradient forces the fluid from area B into area A by way of one of two paths, directly opposite to the compression phase. Liquid may enter the upper flow damper 12 via hole 78. The fluid then leaves the flow damper through hole 79 and enters the lower pressure of area B. The size of hole 78 is limited by the shim 13 attached to the base 9. The shim 13 is manufactured of an appropriate material such that at a certain force the shim will flex downward thereby increasing the area of hole 78. This increased area will allow greater flow rates of liquid to be achieved at the same pressures. This increased flow rate will allow the strut to expand more rapidly damping even further the force which will be transferred through the strut to the user.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the adjustable suspension system of the present invention is capable of being embodied in other forms without departing from its essential characteristics.

What is claimed is:

1. A shock absorber providing improved dampening during compression and expansion thereof, wherein said shock absorber comprises:
   first damping means comprising a barrel, upper and lower mounts, a strut base for receiving the lower end of said barrel, damping fluid, and a helical coil spring acting in compression and expansion of said shock absorber; and
   second damping means comprising a container having an elastic member positioned therein for limiting said flow of said damping fluid into said container;
   wherein said first damping means comprises an adjustable plug, a plug adjustment means for controlling the position of said adjustable plug, at least one shim, and a spring loaded pin having a hole for allowing the flow of said damping fluid;
   wherein said first and second damping means control the flow of said damping fluid within said shock absorber during compression and expansion;
   wherein said first damping means is connected to said second damping means at said base via a tube through which said damping fluid flows during compression and expansion of said shock absorber;
   wherein said adjustable plug controls the flow of said damping fluid;
   wherein said shim restricts said flow of said damping fluid during expansion; and
   wherein said spring loaded pin restricts movement of said plug adjustment means.

2. A shock absorber according to claim 1, wherein said damping fluid is substantially incompressible.

3. A shock absorber according to claim 1, wherein said shock absorber has a connecting appendage for attaching said shock absorber to a motorcycle frame.

4. A shock absorber according to claim 1, wherein said shock absorber has a connecting appendage for attaching said shock absorber to a bicycle frame.

5. A shock absorber according to claim 1, wherein said first damping means further comprises first and second truing caps, said first truing cap located below said upper mount supporting an upper end of said helical coil spring, and said second truing cap located above said base supporting a lower end of said helical coil spring.

6. A shock absorber according to claim 1, wherein said plug adjustment means controls said flow of said damping fluid.

7. A shock absorber according to claim 1, wherein said shim is rigid, wherein said shim restricts said flow of said damping liquid.

8. A shock absorber according to claim 1, wherein said shim allows said flow of said damping fluid during compression of said shock absorber.

9. A shock absorber according to claim 1, wherein said shim and said plug adjustment means together limit said flow of said damping fluid.

10. A shock absorber according to claim 1, wherein said flow of said damping fluid is from said first damping means into said second damping means during compression of said shock absorber.

11. A shock absorber according to claim 1, wherein said flow of said damping fluid is from said second damping means into said first damping means during expansion of said shock absorber.

12. A shock absorber according to claim 1, wherein said shock absorber further comprises at least one means for attaching a conventional bicycle or motorcycle component.

13. A shock absorber according to claim 12, wherein said component is a disc brake caliper.

14. A shock absorber according to claim 12, wherein said component is a brake arch.

15. A shock absorber according to claim 1, wherein said shock absorber connects a frame to the rear wheel of a bicycle or motorcycle.

16. A shock absorber according to claim 1, wherein said shock absorber connects a frame to the front wheel of a bicycle or motorcycle.

17. A shock absorber according to claim 1, wherein said helical coil spring provides mechanical damping of said shock absorber.

18. A shock absorber according to claim 1, wherein said strut base is tapered in a plurality of levels, the narrowest being towards the lower most portion of said base and widest being towards the upper most portion of said base.

19. A shock absorber according to claim 1, wherein the lower most portion of said base comprises an internal region substantially cylindrical, the upper most portion of said internal region having a flow damper positioned therein.

20. A shock absorber according to claim 1, wherein the lower end of said barrel comprises at least one hole for allowing said flow of said damping fluid therethrough during said compression and said expansion.

21. A shock absorber according to claim 20, wherein at least one of said holes provides for said flow of said damping fluid between said first damping means and said second damping means.

22. A shock absorber according to claim 20, wherein at least one of said holes provides for said flow of said damping fluid between an internal region of said barrel and a region of said base surrounding said barrel.

23. A shock absorber according to claim 1, wherein said base further comprises a valve assembly for controlling said flow of said damping fluid into said tube.

24. A shock absorber according to claim 23, wherein said valve assembly includes means for adjusting said flow of said damping fluid.

25. A shock absorber according to claim 1, wherein said container of said second damping means is closed on its upper end.

26. A shock absorber according to claim 25, wherein said closed end of said container includes a means for adding or removing said damping fluid.

27. A shock absorber according to claim 25, wherein said elastic member includes a rigid rim.

28. A shock absorber according to claim 1, said shock absorber further comprising a stem connected on its upper end to said upper mount and on its lower end to a piston, wherein said piston is positioned with lateral seal within said barrel thereby forming at least two internal regions within said barrel.

29. A shock absorber according to claim 28, wherein said piston comprises at least one shim.

30. A shock absorber according to claim 29, wherein said shim restricts said flow of said damping liquid during expansion of said shock absorber.

31. A shock absorber according to claim 29, wherein said shim allows said flow of said damping fluid during compression of said shock absorber.

* * * * *